(No Model.)
J. W. DWIGGINS.
WIRE FENCE.
No. 474,952.   Patented May 17, 1892.
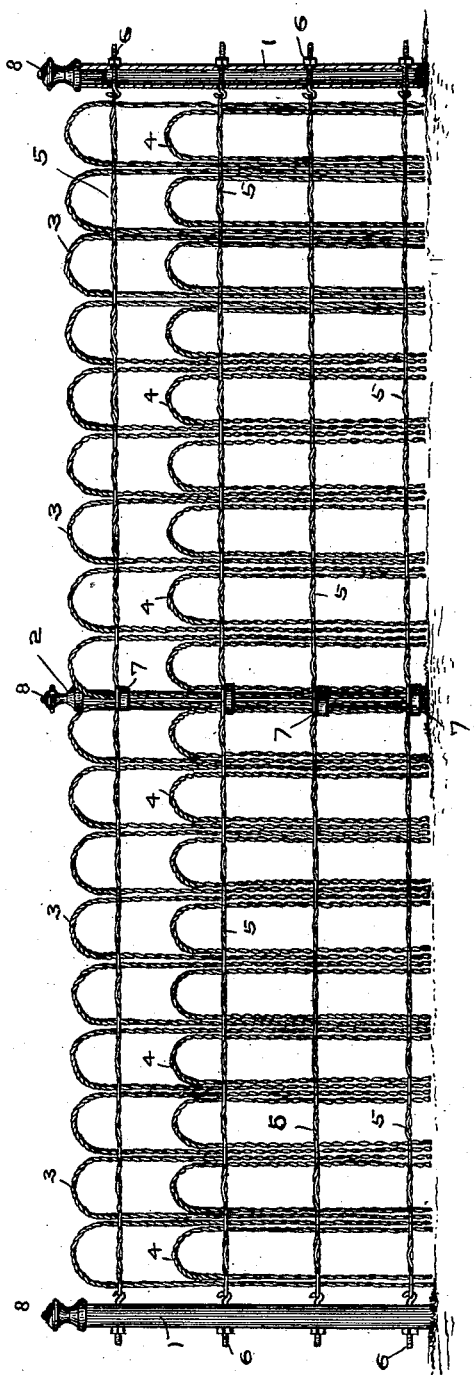
Witnesses
H. D. Nealy
E. B. Griffith
Inventor
John W. Dwiggins
By his Attorney
C. P. Jacobs.

UNITED STATES PATENT OFFICE.

JOHN W. DWIGGINS, OF FRANKTON, ASSIGNOR OF ONE-HALF TO JAMES V. KECK, OF ARCADIA, INDIANA.

WIRE FENCE.

SPECIFICATION forming part of Letters Patent No. 474,952, dated May 17, 1892.

Application filed December 12, 1891. Serial No. 414,895. (No model.)

*To all whom it may concern:*

Be it known that I, JOHN W. DWIGGINS, of Frankton, county of Madison, and State of Indiana, have invented certain new and useful Improvements in Wire Fences; and I do hereby declare that the following is a full, clear, and exact description thereof, reference being had to the accompanying drawing, in which like figures refer to like parts.

My invention relates to improvements in the method of constructing fences from twisted wires and will be understood from the following description.

The drawing represents a front view of two panels of my fence, in which—

1 represents the end posts and 2 the intermediate posts, which are here shown as made of iron piping; but any suitable material may be used. The caps 8 have plugs which enter the openings at the upper end of the post, forming a finish.

The body of the fence is constructed of a series of longer open loops 3 and shorter open loops 4 set between the side wires of the longer loop, each of these loops being composed of two wires twisted together.

5 are horizontal brace-wires which are twisted together in the opening of the loops, so as to bind the adjacent sides of the loop-wires together. The ends of these brace-wires are connected to hook-bolts 6, which pass through the post and are secured by a nut. At the intermediate post the adjacent wires are held together and to the post by a clamp-band 7. The posts have flanged cast-iron bases of the usual form, which are driven in the ground. In the drawings four of the horizontal brace-wires are shown, and this number is adapted to a fence of the ordinary height; but if the fence be lower three of the wires will be sufficient. The wires forming the loops, being closely twisted together, are very strong and solid, and when set adjacent to each other and connected by the horizontal brace-wires 5 the whole makes a strong, serviceable, and durable fence, and one which can be readily set up in the field with little difficulty.

If desired, the loops 3 and 4, instead of being made of two wires twisted together, may be made of a single larger wire connected together in the same manner.

The body of the fence is made in sections of any suitable length, and may be shipped in bundles, and the setting of the posts and the connecting of the brace-wires to the hooks at the end posts and by the clamp-bands to the intermediate post would require only the skill of an ordinary mechanic.

What I claim as my invention, and desire to secure by Letters Patent, is the following:

A wire fence having long vertical loops 3 and shorter vertical loops 4 set one within the other, the ends of such loops extending downward to a line with the surface of the ground, the whole connected by horizontal brace-wires 5, in combination with end posts 1 and intermediate posts 2, all substantially as shown and described.

In witness whereof I have hereunto set my hand this 1st day of July, 1891.

JOHN W. DWIGGINS.

Witnesses:
 C. P. JACOBS,
 E. B. GRIFFITH.